(12) United States Patent
Barbaro et al.

(10) Patent No.: US 7,399,419 B2
(45) Date of Patent: Jul. 15, 2008

(54) MODULAR FILTRATION SYSTEM

(75) Inventors: Ronald D. Barbaro, Southern Shores, NC (US); Ronald E. McIlwain, McLean, VA (US); David Munyan, Woodbury, NJ (US)

(73) Assignee: Filtersure, Inc., McLean, VA (US)

( * ) Notice: Subject to any disclaimer, the term of this patent is extended or adjusted under 35 U.S.C. 154(b) by 545 days.

(21) Appl. No.: 10/976,655

(22) Filed: Oct. 29, 2004

(65) Prior Publication Data

US 2006/0091059 A1   May 4, 2006

(51) Int. Cl.
  *B01D 37/00* (2006.01)
(52) U.S. Cl. ............... 210/791; 55/282; 55/283; 55/309; 55/312; 55/323; 55/485; 95/20; 95/278; 95/287; 210/108; 210/132; 210/332; 210/333.01; 210/434; 210/741
(58) Field of Classification Search ............... 210/108, 210/130, 189, 332, 333.01, 340, 341, 418–427, 210/433.1, 252–262, 327, 741, 791–798, 210/434; 55/282–288, 302, 309, 318–323, 55/485, 312; 95/20, 278, 287; 96/42, 233
See application file for complete search history.

(56) References Cited

U.S. PATENT DOCUMENTS

| 542,586 | A | * | 7/1895 | Eassie et al. ............. 210/189 |
| 547,547 | A | | 10/1895 | Heideman |
| 590,868 | A | | 9/1897 | Wanner et al. |
| 636,447 | A | | 11/1899 | Paddock |
| 1,332,877 | A | * | 3/1920 | Azpiazu ............. 210/261 |
| 1,438,797 | A | * | 12/1922 | Vachier ............. 210/327 |
| 1,994,055 | A | * | 3/1935 | Thomas ............. 110/221 |
| 2,087,442 | A | | 7/1937 | Nack |
| 2,858,024 | A | * | 10/1958 | Babcock ............. 210/108 |
| 3,021,954 | A | * | 2/1962 | Allen ............. 210/132 |
| 4,906,381 | A | | 3/1990 | Barbaro |

FOREIGN PATENT DOCUMENTS

SU   393215   9/1970

* cited by examiner

*Primary Examiner*—Joseph W Drodge
(74) *Attorney, Agent, or Firm*—Workman Nydegger

(57) ABSTRACT

A filter system includes a set of modules, each module including screen assemblies and filter media sandwiched between the screen assemblies. A plurality of control assemblies are associated with each of the modules. Each of the control assemblies is in fluid communication with a corresponding module to control flow through the corresponding module. The control assemblies selectively control fluid in each of the modules between at least one of a forward flow through the screen assemblies to treat an influent flow, a bypass flow to bypass at least one of the modules, and a reverse flow to backwash a given filter media. A method of filtering influent includes providing an influent flow to a set of modules, each module including screen assemblies and filter media sandwiched between the screen assemblies. The influent is filtered by directing the influent through the set of modules. A given module is bypassed when the given module becomes occluded. The occluded module is backwashed by providing a reverse flow through the screen assemblies and the filter media.

26 Claims, 11 Drawing Sheets

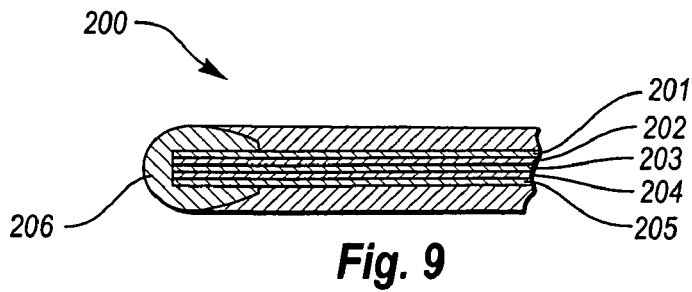
Fig. 9
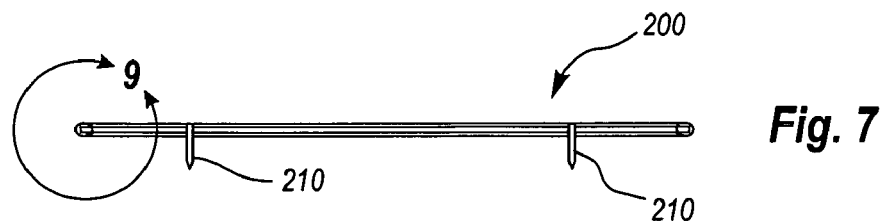
Fig. 7
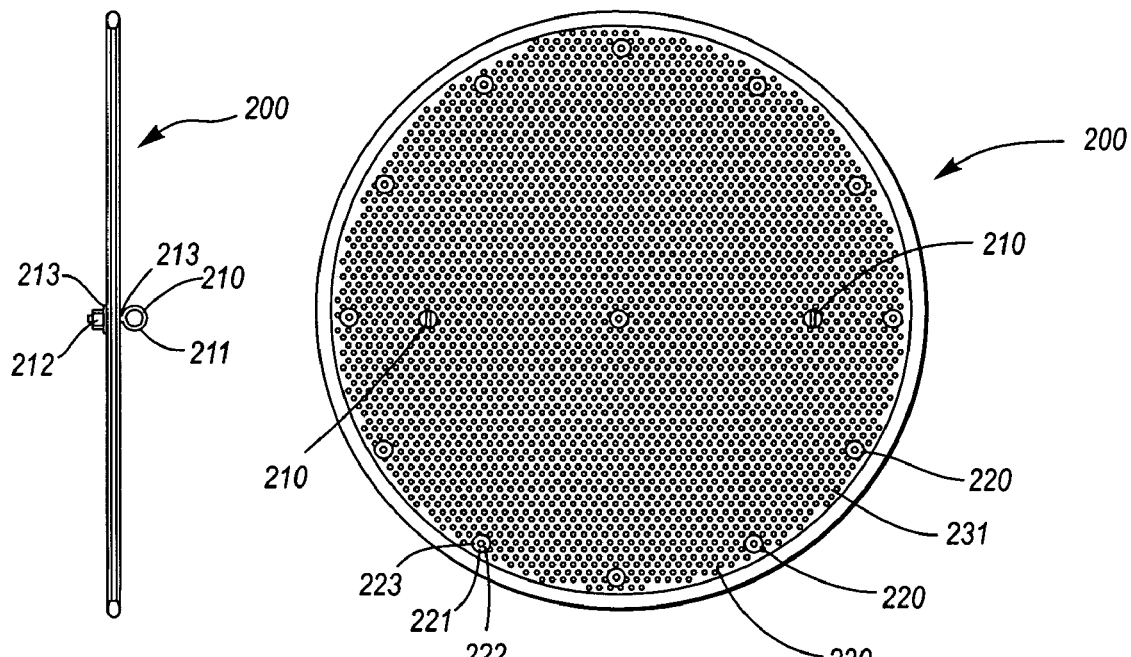
Fig. 8
Fig. 6

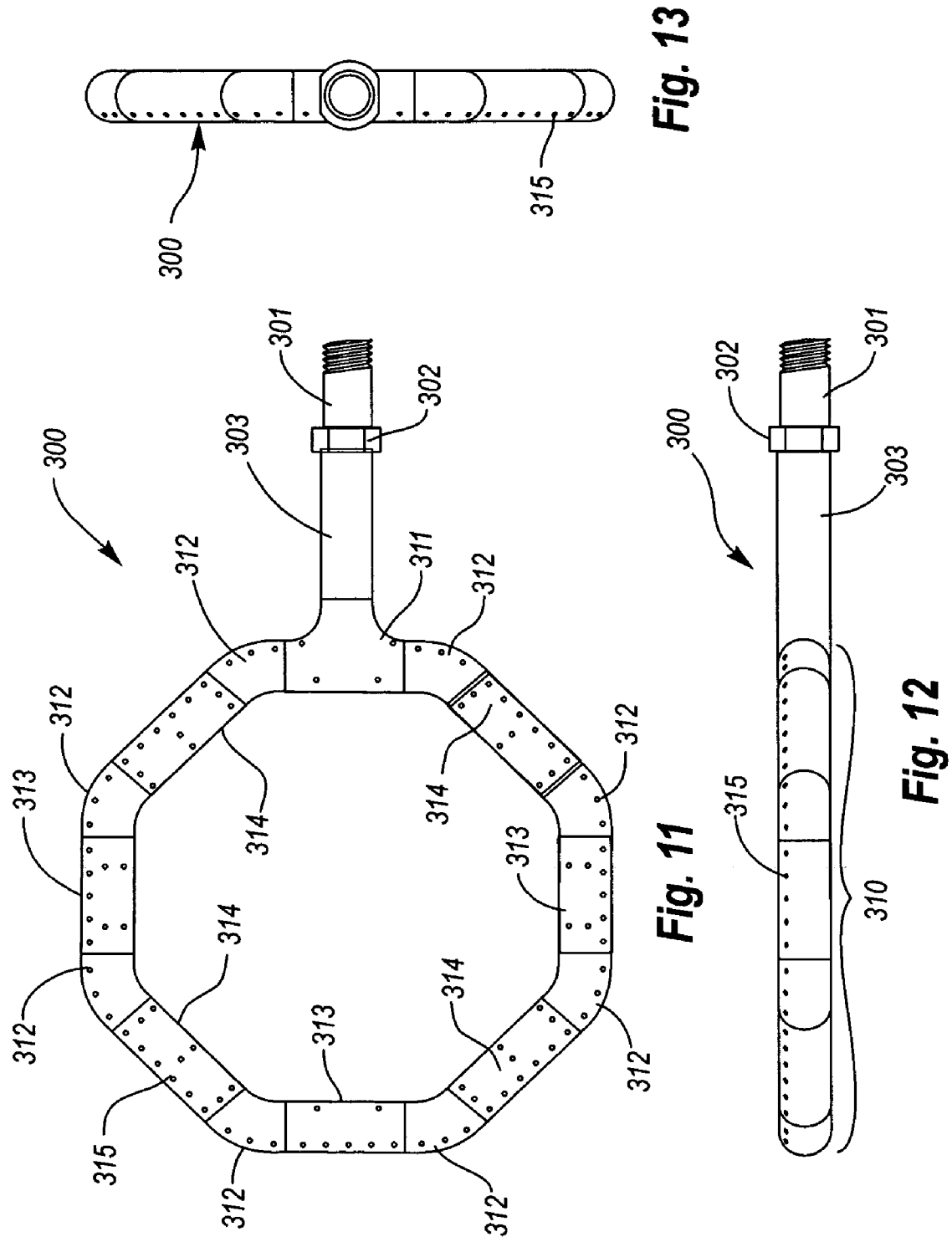

MODULAR FILTRATION SYSTEM

BACKGROUND OF THE INVENTION

1. Field of the Invention

The present invention relates to filtration equipment, and more particularly, to a modular filtration system.

2. Discussion of the Related Art

Various filtration systems have been developed for water purification, waste reclamation, fruit drink preparation or other solid/liquid separation. The filtration systems have included different sizes of filtration media that vary with the nature and size of the solids to be removed from the liquid phase. In these filtration systems, however, the flow path typically becomes occluded as the solids accumulate on the filter media. When the filtration system has become occluded, the filters must either be backwashed or removed from service in order to remove the accumulated solids.

One problem in filter systems is that the process must be interrupted to backwash the system. When backwashing or removing the system from service, the process is interrupted or shut-down to remove the accumulated solids from the filter media. The flow is diverted to a holding state or a recycle flow during the solids removal creating a backlog in the process. Additionally, once restarted, the flow must be tested to determine that the particles in the effluent are within the desired limits.

Another problem that exists in filtration systems is that the media becomes mixed during the backwashing or solids removal. Typically, the filter system includes a chamber having media that is varied from coarse to fine material. The flow starts with a coarse media to remove the larger solids, then trickles down to the finer media to remove the smaller particles. After the system has been backwashed, however, the media is mixed when the backwash flow pushes the finer media up through the coarse media. The backwash flow can also push the filter media to the edges of the chamber creating a short circuit through the media. Thus, after each backwashing, the filtration system can be rendered less effective.

SUMMARY OF THE INVENTION

A filter system includes a set of modules, each module including screen assemblies and filter media sandwiched between the screen assemblies. A plurality of control assemblies are associated with each of the modules. Each of the control assemblies is in fluid communication with a corresponding module to control flow through the corresponding module. The control assemblies selectively control fluid in each of the modules between at least one of a forward flow through the screen assemblies to treat an influent flow, a bypass flow to bypass at least one of the modules, and a reverse flow to backwash a given filter media.

In another aspect of the invention, a method of filtering influent can be provided. The method includes a step of providing an influent flow to a set of modules, each module including screen assemblies and filter media sandwiched between the screen assemblies. The influent is filtered by directing the influent through the set of modules. When a given module becomes occluded, it is bypassed. The occluded module is backwashed by providing a reverse flow through the screen assemblies and filter media.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments of the invention, which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 6 is a top view of a screen assembly in accordance with an embodiment of the present invention;

FIG. 7 is a first side view of the screen assembly of FIG. 6;

FIG. 8 is a second side view of the screen assembly of FIG. 6;

FIG. 9 is a detailed side view of the screen assembly of FIG. 6;

FIG. 11 is a top view of a backwash tube assembly in accordance with an embodiment of the present invention;

FIG. 12 is a first side view of the backwash tube assembly of FIG. 11;

FIG. 13 is a second side view of the backwash tube assembly of FIG. 11;

FIGS. 17A-C illustrate positions of valves in a module control assembly in accordance with an embodiment of the present invention.

DESCRIPTION OF THE PREFERRED EMBODIMENTS

Figure 1:
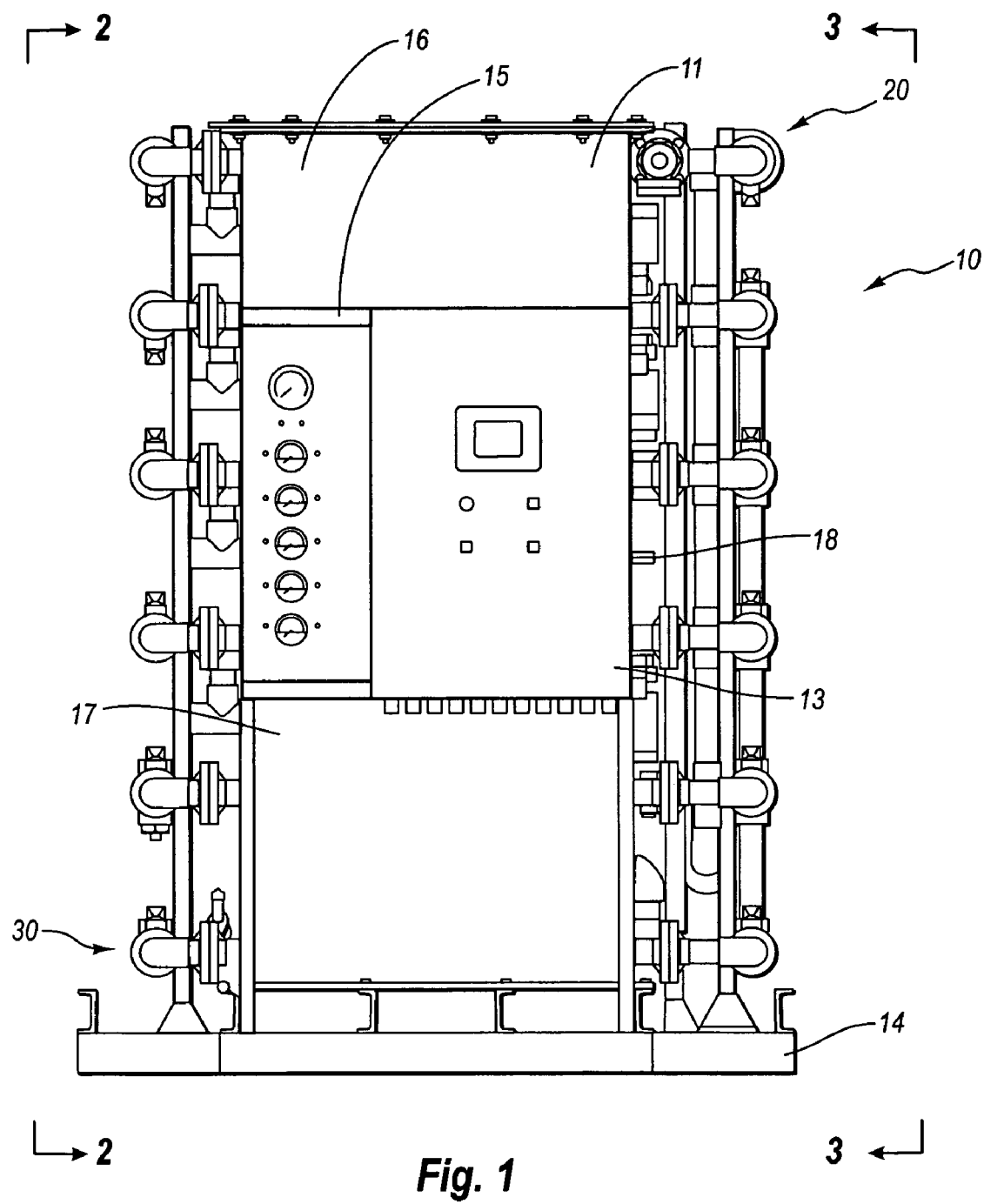
FIG. 1 is a front view illustrating the filter system in accordance with an embodiment of the present invention.
Figure 2:
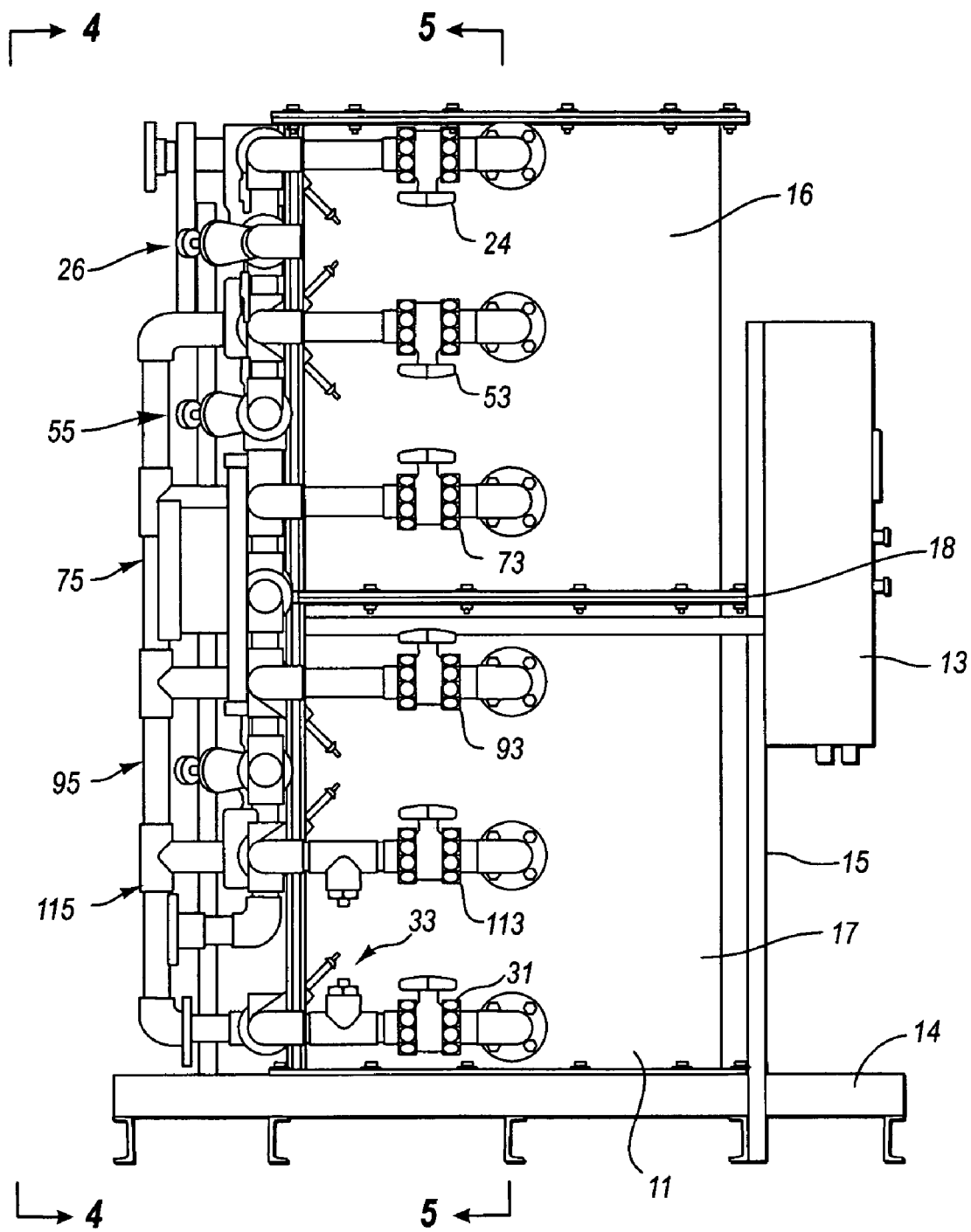
FIG. 2 is a first side view of the filter system illustrated in FIG. 1.
Figure 3:
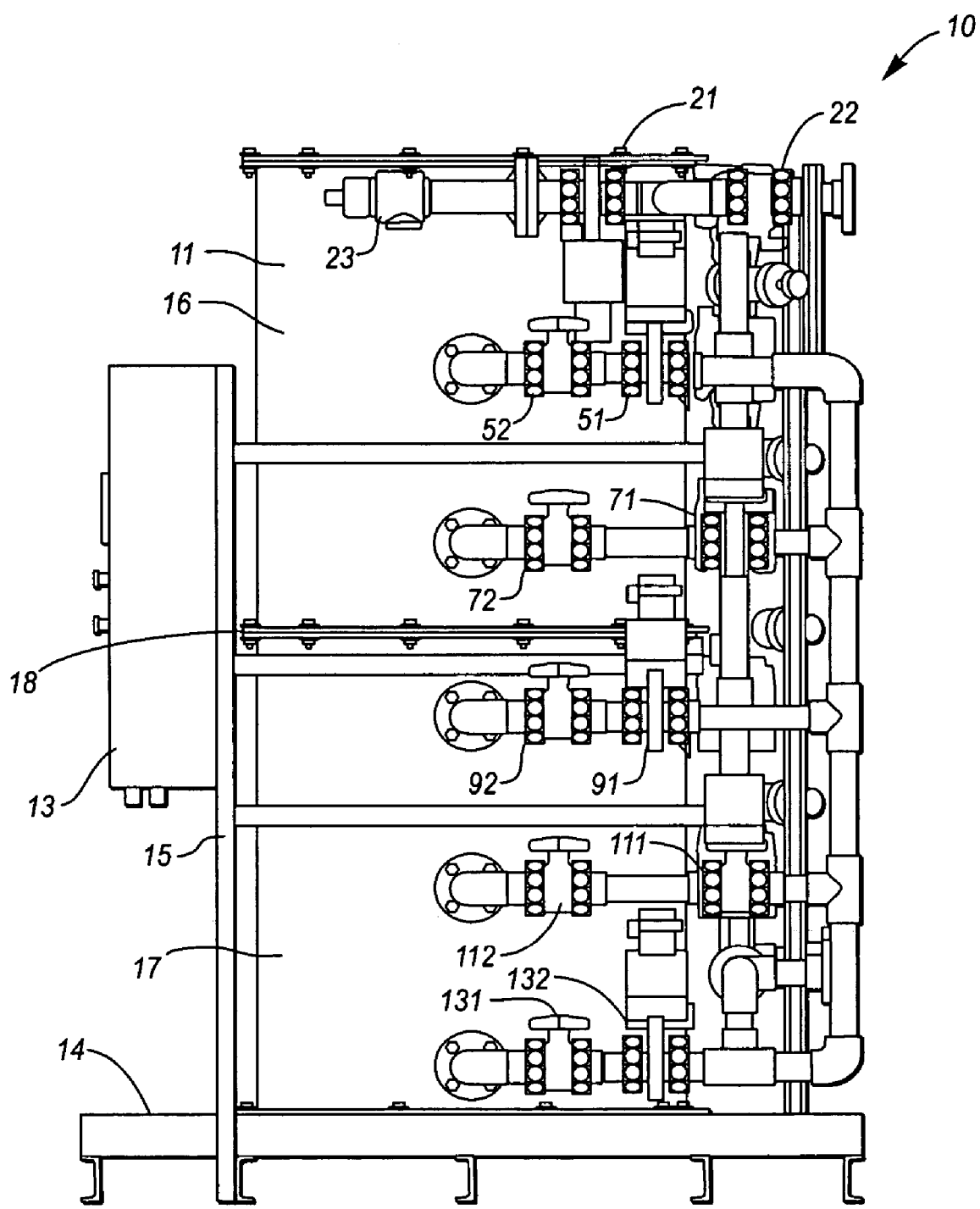
FIG. 3 is a second side view of the filter system illustrated in FIG. 1.
Figure 4:
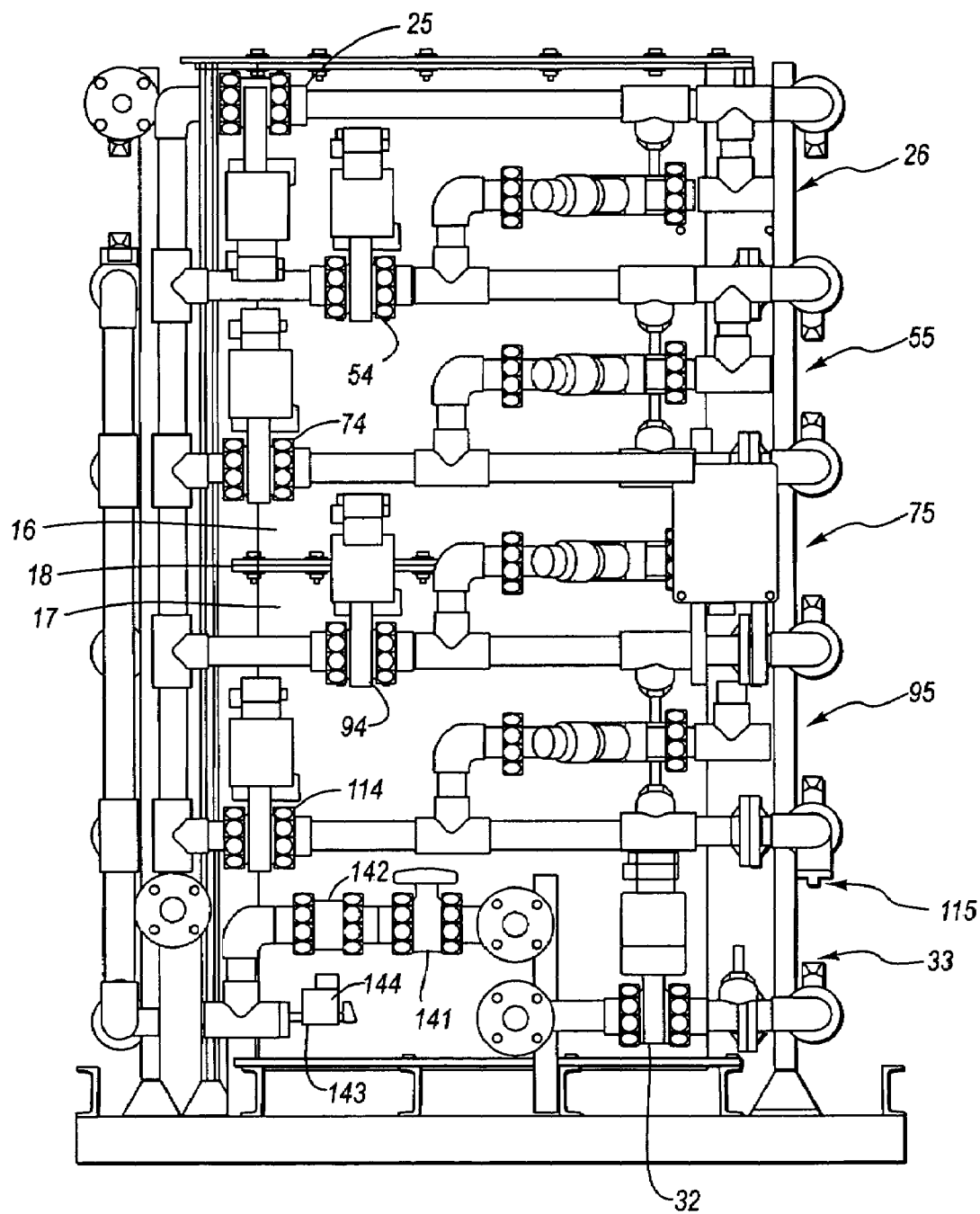
FIG. 4 is a back view of the filter system illustrated in FIG. 1.
Figure 5:
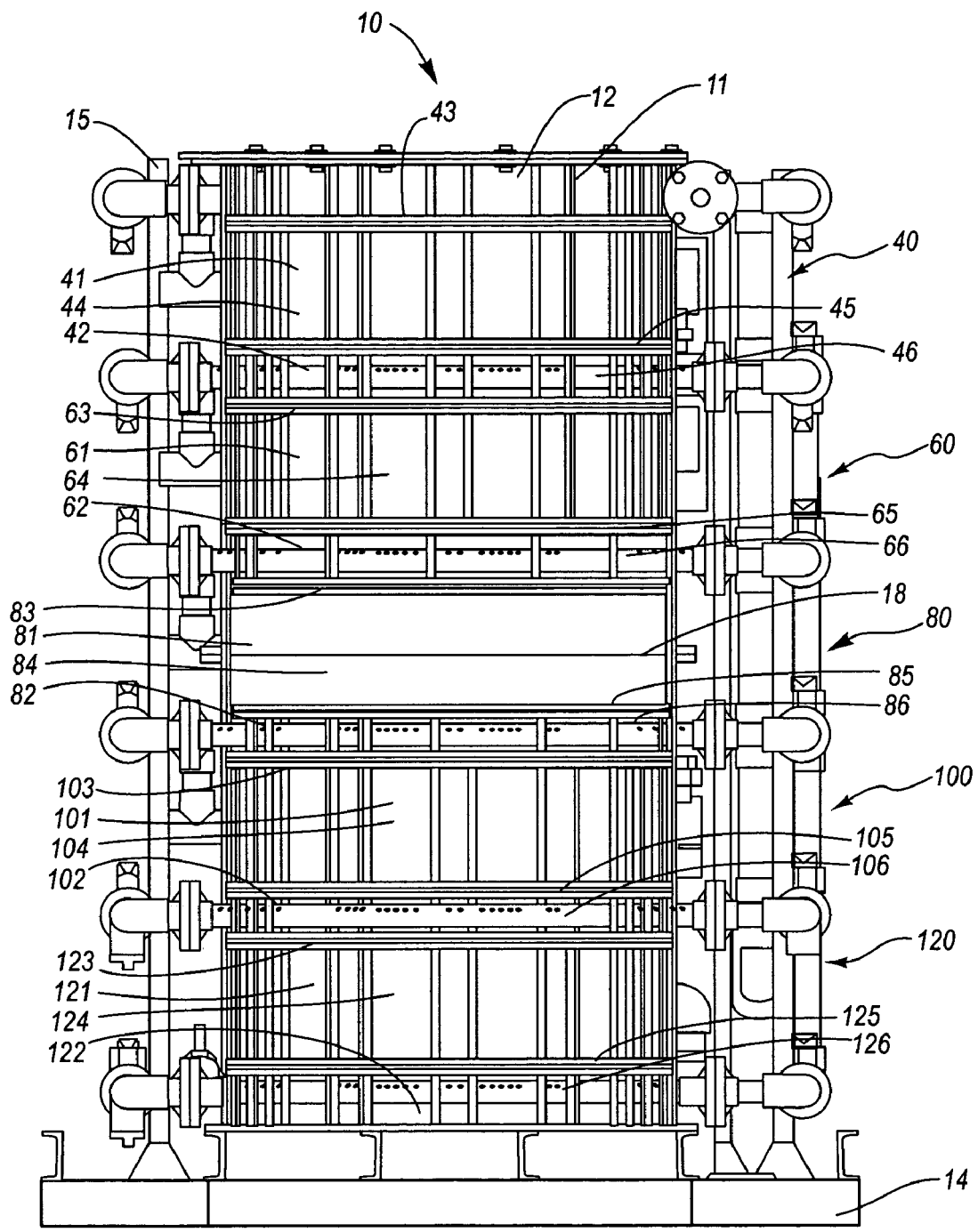
FIG. 5 is a cross sectional front view of the filter system illustrated in FIG. 1.

The subject of this application is a filtration system including various components, which may be implemented to filter a process flow. Although particular combinations of components are used to achieve a desired process flow, variations on those combinations can be used to achieve the same filtration system.

As illustrated in FIGS. 1-5 and 14 of the present invention, a filter system 10 can include a frame 11, an influent chamber 12, a control panel 13, influent control assembly 20, effluent control assembly 30, modules 40, 60, 80, 100, 120, control assemblies 50, 70, 90, 110, 130 and a backwash control assembly 140. The frame 11 provides structural support for the components of the filter system 10 and is sized to meet the flow requirements of a given process. The frame 11 can be made of structural members, such as channels, angles, beams, tubes and/or plates. The structural members can be made of a metal or plastic material, such as steel, stainless steel, polypropylene or other type of structural material. The frame 11 is arranged to provide a base 14 and a side structure 15. The base 14 provides support for the filter system 10 on a floor or substrate. The side structure 15 provides support for the control panel 13 and control assemblies 20, 30, 50, 70, 90, 110, 130, 140.

The control panel 13 includes various controls for monitoring the flow through the filter system 10. The control panel 13 can include relays, switches, alarms, sensors, gauges, lights and displays for monitoring and controlling certain aspects of the filter system 10, which will become more apparent in the disclosure below. For example, an alarm can sound externally, indicate a malfunction and a malfunction location. An electrical source (not shown) is connected to the control panel 13 when the filter system 10 is in operation.

The influent chamber 12 is provided at the top or initial stage of the filter system 10. Influent from an influent source flows into the influent chamber 12 to provide detention time before the flow passes through the modules 40, 60, 80, 100, 120. The influent control assembly 20 includes valve 21, valve 22, relief valve 23, valve 24, valve 25 and a pressure control assembly 26. The influent is in communication with the influent chamber 12 and is controlled by valve 21 and valve 22. The valve 21, in the preferred embodiment, can be an automatic valve, such as a solenoid valve or other structure for controlling flow. The valve 22, in the preferred embodiment, can be a manual valve, such as a butterfly valve, ball valve, gate valve or other structure for controlling flow.

Overflow from the influent chamber 12 is controlled by the relief valve 23. The relief valve 23, in the preferred embodiment, can be a pressure relief valve, safety relief valve or other structure for providing pressure relief in a fluid line. If the influent chamber 12 becomes backed up due to positive flow not flowing through the filter system 10, pressure could build up in the influent chamber 12. When a predetermined pressure is exceeded in the chamber, the relief valve 23 opens to allow the excess pressure and flow to escape out of the influent chamber 12 into the environ.

The valve 24 and valve 25 provide a control device to direct the flow from backwashing any of the lower filter medias at controlled intervals, such as when a pressure limit is exceeded or at a certain time during a given day. The valve 24, in the preferred embodiment, can be a manual valve, such as a butterfly valve, ball valve, gate valve or other structure for controlling flow. The valve 25, in the preferred embodiment, can be an automatic valve, such as a solenoid valve or other structure for controlling flow. The valves 24 and 25 are in fluid communication between the influent chamber 12 and the backwash flow line. The backwash flow is preferably either recycled through the filter system 10 or temporarily stored in a holding tank.

The pressure control assembly 26 includes a pressure gauge, a pressure transmitter and a bypass valve. The pressure gauge measures the pressure in the influent chamber 12. The pressure control assembly 26 sends the measured pressure reading to the control panel 13, where a pressure difference can be calculated between the first module 40 and the second module 60 by comparing measurements from the pressure control assembly 55 to the pressure control assembly 26. The pressure control assembly 26 can be set to a predetermined pressure difference. For example, the pressure difference can be set between about 5 PSI and 25 PSI, and more specifically at about 10 PSI. When the pressure difference is exceeded, a signal can be sent to various valves to redirect, recycle the flow and/or backwash the filter system 10, for instance, a signal can be sent to the bypass valve in the pressure control assembly 26 to open the bypass valve, bypassing the flow to a subsequent module for further filtration.

The effluent control assembly 30 includes valve 31, valve 32 and pressure control assembly 33. The valve 31 and valve 32 provide a control device to direct the flow out from the filter system 10. The valve 31, in the preferred embodiment, can be a manual valve, such as a butterfly valve, ball valve, gate valve or other structure for controlling flow. The valve 32, in the preferred embodiment, can be an automatic valve, such as a solenoid valve or other structure for controlling flow. The pressure control assembly 33 includes a pressure gauge and a pressure transmitter. The pressure control assembly measures the pressure at the effluent line and sends the measured pressure reading to the control panel 13. The valves 31 and 32 are in fluid communication between the filter system 10 and the effluent line. The effluent flow is directed down stream to a holding tank, an apparatus for further processing, or otherwise disposed, for example, in a water reserve, river, lake or ocean.

The first module 40 is provided below the influent chamber 12. The first module 40 includes an upper section 41, a lower section 42, a screen assembly 43, filter media 44, a screen assembly 45 and a backwash tube assembly 46. The screen assemblies 43, 45 and filter media 44 are provided in the upper section 41 of the first module 40. The filter media 44 is provided between the screen assembly 43 and screen assembly 45. The screen assemblies 43, 45 enclose and retain the filter media 44 within the upper section 41. The filter media 44 can include 1.0 mm walnut shells, anthracite, sand and/or garnet. For example, the filter media can be sand sized between No. 4 0.80 mm, No. 3 0.45 mm and No. 2 0.25 mm.

The backwash tube assembly 46 is provided in the lower section 42 below the screen assembly 45. When the filter system 10 is backwashing the first module 40, the backwash tube assembly 46 provides reverse flow through the filter media 44 to clean any accumulated solids from the filter media 44. The backwash flow is directed through the first module 40 and into the influent chamber 12 where the flow is directed to the backwash flow line.

The control assembly 50 includes valve 51, valve 52, valve 53, valve 54 and a pressure control assembly 55. The backwash flow is directed from a backwash source to the first module 40 and is controlled by valve 51 and valve 52. The valve 51, in the preferred embodiment, can be an automatic valve, such as a solenoid valve or other structure for controlling flow. The valve 52, in the preferred embodiment, can be a manual valve, such as a butterfly valve, ball valve, gate valve or other structure for controlling flow.

The valve 53 and valve 54 provide a control device to direct the flow from backwashing any of the lower filter media. The valve 53, in the preferred embodiment, can be a manual valve, such as a butterfly valve, ball valve, gate valve or other structure for controlling flow. The valve 54, in the preferred embodiment, can be an automatic valve, such as a solenoid valve or other structure for controlling flow. The valves 53 and 54 are in fluid communication with the first module 40 and the backwash flow line.

The pressure control assembly 55 includes a pressure gauge, a pressure transmitter and a bypass valve. The pressure gauge measures the pressure in the upper section of the second module 60. The pressure control assembly 55 sends the measured pressure reading to the control panel 13, where a pressure difference can be calculated between adjacent modules by comparing measurements from the pressure control assembly 26 or the pressure control assembly 75 to the pressure control assembly 55. The pressure control assembly 55 can be set to a predetermined pressure difference. For example, the pressure difference can be set between about 5 PSI and 25 PSI, and more specifically at about 10 PSI. When the pressure difference is exceeded, a signal can be sent to various valves to redirect, recycle the flow and/or backwash the filter system 10, for instance, a signal can be sent to the bypass valve in the pressure control assembly 55 to open the bypass valve, bypassing the flow to a subsequent module for further filtration.

The second module 60 is provided between the first module 40 and the third module 80. The second module 60 includes an upper section 61, a lower section 62, a screen assembly 63, filter media 64, a screen assembly 65 and a backwash tube assembly 66. The screen assemblies 63, 65 and filter media 64 are provided in the upper section 61 of the second module 60. The filter media 64 is provided between the screen assembly 63 and screen assembly 65. The screen assemblies 63, 65 enclose and retain the filter media 64 within the upper section 61. The filter media 64 can include similar materials to those discussed above with respect to filter media 44.

The backwash tube assembly 66 is provided in the lower section 62 below the screen assembly 65. When the filter system 10 is backwashing the second module 60, the backwash tube assembly 66 provides reverse flow through the filter media 64 to clean any accumulated solids from the filter media 64. The backwash flow is directed through the second module 60 and into the first module 40 where the flow is directed to the backwash flow line.

The control assembly 70 includes valve 71, valve 72, valve 73, valve 74 and a pressure control assembly 75. The backwash flow is directed from a backwash source to the second module 60 and is controlled by valve 71 and valve 72. The valve 71, in the preferred embodiment, can be an automatic valve, such as a solenoid valve or other structure for controlling flow. The valve 72, in the preferred embodiment, can be a manual valve, such as a butterfly valve, ball valve, gate valve or other structure for controlling flow.

The valve 73 and valve 74 provide a control device to direct the flow from backwashing any of the lower filter media. The valve 73, in the preferred embodiment, can be a manual valve, such as a butterfly valve, ball valve, gate valve or other structure for controlling flow. The valve 74, in the preferred embodiment, can be an automatic valve, such as a solenoid valve or other structure for controlling flow. The valves 73 and 74 are in fluid communication with the second module 60 and the backwash flow line.

The pressure control assembly 75 includes a pressure gauge, a pressure transmitter and a bypass valve. The pressure gauge measures the pressure in the upper section of the third module 80. The pressure control assembly 75 sends the measured pressure reading to the control panel 13, where a pressure difference can be calculated between adjacent modules by comparing measurements from the pressure control assembly 55 or the pressure control assembly 95 to the pressure control assembly 75. The pressure control assembly 75 can be set to a predetermined pressure difference. For example, the pressure difference can be set between about 5 PSI and 25 PSI, and more specifically at about 10 PSI. When the pressure difference is exceeded, a signal can be sent to various valves to redirect, recycle the flow and/or backwash the filter system 10, for instance, a signal can be sent to the bypass valve in the pressure control assembly 75 to open the bypass valve, bypassing the flow to a subsequent module for further filtration.

The third module 80 is provided between the second module 60 and the fourth module 100. The third module 80 includes an upper section 81, a lower section 82, a screen assembly 83, filter media 84, a screen assembly 85 and a backwash tube assembly 86. The screen assemblies 83, 85 and filter media 84 are provided in the upper section 81 of the third module 80. The filter media 84 is provided between the screen assembly 83 and screen assembly 85. The screen assemblies 83, 85 enclose and retain the filter media 84 within the upper section 81. The filter media 84 can include similar materials to those discussed above with respect to filter media 44.

The backwash tube assembly 86 is provided in the lower section 82 below the screen assembly 85. When the filter system 10 is backwashing the third module 80, the backwash tube assembly 86 provides reverse flow through the filter media 84 to clean any accumulated solids from the filter media 84. The backwash flow is directed through the third module 80 and into the second module 60 where the flow is directed to the backwash flow line.

The control assembly 90 includes valve 91, valve 92, valve 93, valve 94 and a pressure control assembly 95. The backwash flow is directed from a backwash source to the third module 80 and is controlled by valve 91 and valve 92. The valve 91, in the preferred embodiment, can be an automatic valve, such as a solenoid valve or other structure for controlling flow. The valve 92, in the preferred embodiment, can be a manual valve, such as a butterfly valve, ball valve, gate valve or other structure for controlling flow.

The valve 93 and valve 94 provide a control device to direct the flow from backwashing any of the lower filter media. The valve 93, in the preferred embodiment, can be a manual valve, such as a butterfly valve, ball valve, gate valve or other structure for controlling flow. The valve 94, in the preferred embodiment, can be an automatic valve, such as a solenoid valve or other structure for controlling flow. The valves 93 and 94 are in fluid communication with the third module 80 and the backwash flow line.

The pressure control assembly 95 includes a pressure gauge, a pressure transmitter and a bypass valve. The pressure gauge measures the pressure in the upper section of the fourth module 100. The pressure control assembly 95 sends the measured pressure reading to the control panel 13, where a pressure difference can be calculated between adjacent modules by comparing measurements from the pressure control assembly 75 or the pressure control assembly 115 to the pressure control assembly 95. The pressure control assembly 95 can be set to a predetermined pressure difference. For example, the pressure difference can be set between about 5 PSI and 25 PSI, and more specifically at about 10 PSI. When the pressure difference is exceeded, a signal can be sent to various valves to redirect, recycle the flow and/or backwash the filter system 10, for instance, a signal can be sent to the bypass valve in the pressure control assembly 95 to open the bypass valve, bypassing the flow to a subsequent module for further filtration.

The fourth module 100 is provided between the third module 80 and the fifth module 120. The fourth module 100 includes an upper section 101, a lower section 102, a screen assembly 103, filter media 104, a screen assembly 105 and a backwash tube assembly 106. The screen assemblies 103, 105 and filter media 104 are provided in the upper section 101 of the fourth module 100. The filter media 104 is provided between the screen assembly 103 and screen assembly 105. The screen assemblies 103, 105 enclose and retain the filter media 104 within the upper section 101. The filter media 104 can include similar materials to those discussed above with respect to filter media 44.

The backwash tube assembly 106 is provided in the lower section 102 below the screen assembly 105. When the filter system 10 is backwashing the fourth module 100, the backwash tube assembly 106 provides reverse flow through the filter media 104 to clean any accumulated solids from the filter media 104. The backwash flow is directed through the fourth module 100 and into the third module 80 where the flow is directed to the backwash flow line.

The control assembly 110 includes valve 111, valve 112, valve 113, valve 114 and a pressure control assembly 115. The backwash flow is directed from a backwash source to the fourth module 100 and is controlled by valve 111 and valve 112. The valve 111, in the preferred embodiment, can be an automatic valve, such as a solenoid valve or other structure for controlling flow. The valve 112, in the preferred embodiment, can be a manual valve, such as a butterfly valve, ball valve, gate valve or other structure for controlling flow.

The valve 113 and valve 114 provide a control device to direct the flow from backwashing any of the lower filter media. The valve 113, in the preferred embodiment, can be a manual valve, such as a butterfly valve, ball valve, gate valve or other structure for controlling flow. The valve 114, in the preferred embodiment, can be an automatic valve, such as a solenoid valve or other structure for controlling flow. The valves 113 and 114 are in fluid communication with the fourth module 100 and the backwash flow line.

The pressure control assembly 115 includes a pressure gauge and a pressure transmitter. The pressure gauge measures the pressure in the upper section of the fifth module 120. The pressure control assembly 115 sends the measured pressure reading to the control panel 13, where a pressure difference can be calculated between adjacent modules by comparing measurements from the pressure control assembly 33 or the pressure control assembly 95 to the pressure control assembly 115. The pressure control assembly 115 can be set to a predetermined pressure difference. For example, the pressure difference can be set between about 5 PSI and 25 PSI, and more specifically at about 10 PSI. When the pressure difference is exceeded, a signal can be sent to various valves to redirect, recycle the flow and/or backwash the filter system 10.

The fifth module 120 is provided below the fourth module 100 and the effluent line. The fifth module 120 includes an upper section 121, a lower section 122, a screen assembly 123, filter media 124, a screen assembly 125 and a backwash tube assembly 126. The screen assemblies 123, 125 and filter media 124 are provided in the upper section 121 of the fifth module 120. The filter media 124 is provided between the screen assembly 123 and screen assembly 125. The screen assemblies 123, 125 enclose and retain the filter media 124 within the upper section 121. The filter media 124 can include similar materials to those discussed above with respect to filter media 44.

The backwash tube assembly 126 is provided in the lower section 122 below the screen assembly 125. When the filter system 10 is backwashing the fifth module 120, the backwash tube assembly 126 provides reverse flow through the filter media 124 to clean any accumulated solids from the filter media 124. The backwash flow is directed through the fifth module 120 and into the fourth module 100 where the flow is directed to the backwash flow line.

The control assembly 130 includes valve 131 and valve 132. The backwash flow is directed from a backwash source to the fifth module 120 and is controlled by valve 131 and valve 132. The valve 131, in the preferred embodiment, can be a manual valve, such as a butterfly valve, ball valve, gate valve or other structure for controlling flow. The valve 132, in the preferred embodiment, can be an automatic valve, such as a solenoid valve or other structure for controlling flow.

The backwash control assembly 140 includes valve 141, valve 142, valve 143 and valve 144. The backwash flow is directed from a backwash source to any of the modules 40, 60, 80, 100, 120. The valve 141, in the preferred embodiment, can be a manual valve, such as a butterfly valve, ball valve, gate valve or other structure for controlling flow. The manual valves in the filter system 10 are provided to allow an operator to manually shut down a section of the filter system for repair or replacement of specific components or to redirect flow to other desired areas.

The valve 142 and valve 143 can be control valves to prevent flow from returning or otherwise being misdirected through the lines. The valve 142 is provided in the backwash line and valve 143 is provided in a compressed air line. The compressed air line is in communication with an air source. The compressed air forces air into the backwash line to push the backwash flow up through the filter media being backwashed. The valve 144, in the preferred embodiment, can be an automatic valve, such as a solenoid valve or other structure for controlling flow. The valve 144 is in fluid communication with the compressed air line. The compressed air flow is controlled by valve 144.

As shown in FIGS. 6-10, a screen assembly 200 includes a first screen 201, a first backing screen 202, a filter cloth 203, a second backing screen 204, a second screen 205 and a seal 206. The filter cloth 203 is provided between the first backing screen 202 and the second backing screen 204. The filter cloth 203 can be selected to have a specific mesh size to meet a desired application. The first screen 201 is provided above the first backing screen 202 and the second screen 205 is provided below the second backing screen 204. The seal 206 can be provided around the outer edge of the screen assembly 200 to seal and enclose the first and second screens 201, 205, the first and second backing screens 202, 204 and filter cloth 203 as shown in FIG. 9. The seal 206 can be made of a pliable material, such as plastic, foam or rubber. The seal 206 defines an effective portion of the screen assembly 200. The screen assembly 200 can be sized according to the influent parameters of the given process. For example, the effective portion of the screen assembly 200 can have a diameter of about 33.25 inches.

The screen assembly 200 can include fasteners 210 to attach components such as a backwash tube assembly. The fasteners 210 can include bolts 211, nuts 212 and washers 213. The bolts 211 can be eyebolts made of a metal or plastic material, such as steel, stainless steel, polypropylene or other type of structural material. For example, the bolts 211 can be ¼ inch—20 stainless steel eyebolts. The nuts 212 can be hex nuts, locking nuts or other structures for fastening, which are sized to match each of the bolts 211. Each of the bolts 211 can be inserted into the side of the screen assembly 200 having the second screen 205 and attached with one of the washers 213 and nuts 212 on the side having the first screen 201. For example, the fasteners 210 can include two fasteners 210 equally spaced from a center point and aligned along a line passing through the center point as shown in FIG. 6.

Fasteners 220 can be used to tie the components of the screen assembly 200 together along the perimeter. The fasteners 220 include bolts 221, nuts 222 and washers 223. The bolts 221 can be made of a metal or plastic material, such as steel, stainless steel, polypropylene or other type of structural material. For example, the bolts 221 can be a ¼ inch—20 stainless steel bolts. The nuts 222 can be hex nuts, locking nuts or other structures for fastening, which are sized to match each of the bolts 221. Each of the bolts 221 can be inserted into one side of the screen assembly 200 and attached with one of the washers 223 and nuts 222 on the other side. For example, the fasteners 220 can include twelve fasteners 220 equally spaced along the perimeter of the screen assembly as shown in FIG. 6.

Figure 10:
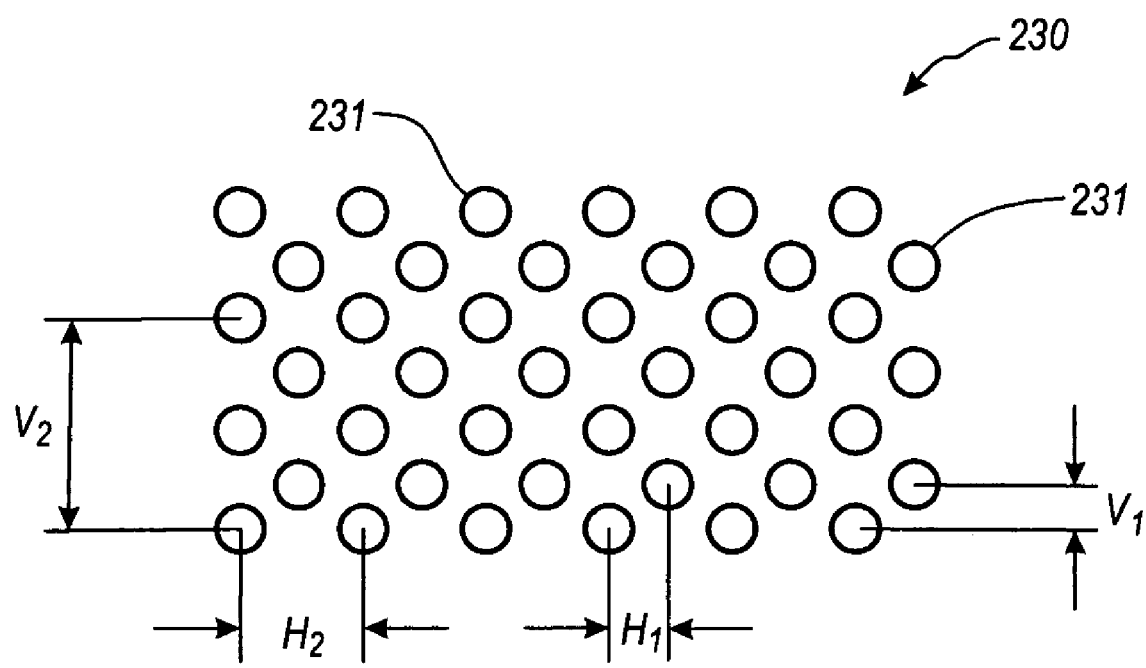
FIG. 10 is a detailed top view of the screen assembly of FIG. 6.

The first and second backing screens 202, 204 can have a perforation pattern 230 made from apertures 231, as shown in FIG. 10. For example, the apertures 231 can be about 0.25 inch diameter holes spaced at about 0.312 inches apart from each other along a horizontal line and spaced about 0.624 inches from the next aperture along the same horizontal line. Also, the apertures 231 can be spaced at about 0.27 inches apart from each other along a vertical line and spaced about 0.54 inches from the next aperture along the same vertical line.

Referring to FIGS. 11-13, a backwash tube assembly 300 includes a fitting 301, a sleeve 302, tubing 303 and backwash tubing 310. The fitting 301 is attached to the sleeve 302 and the sleeve 302 is attached to the tubing 303. A control assembly is attached to the fitting 301 to provide backwash flow to the backwash tube assembly 300. The backwash tubing 310 can be shaped to provide a backwash spray around the screen assembly 200 and can be made of a material, such as steel, stainless steel, plastic or other type of tubing material known to one skilled in the art. For example, the backwash tube assembly 300 can be arranged in the shape of a circle, square, triangle, octagon, or other arrangement for dispersing a fluid. If the backwash tube assembly is octagonal shaped, the backwash tubing 310 can include a tee 311, elbows 312, tubing 313 and tubing 314. The elbows can be eight (8) 45 degree elbows made of 304 stainless steel. The tubing 313 can be three (3) short lengths of tubing and tubing 314 can be four (4) long lengths of tubing. The tubing 313 is arranged on radial lines equally spaced at 90 degrees from the tee 311. The tubing 314 is arranged on radial lines equally spaced at 45 degrees from the tee 311. The tee 311, elbows 312 and tubing 313, 314 are arranged to form an octagonal shape as shown in FIG. 11. The backwash tubing 310 includes orifices 315 spaced along the tee 311, elbows 312 and tubing 313, 314 to provide an outlet for the backwash flow. The orifices 315 can be about 0.125 inch to about 0.172 inch diameter holes drilled into the backwash tubing 310.

Figure 14:
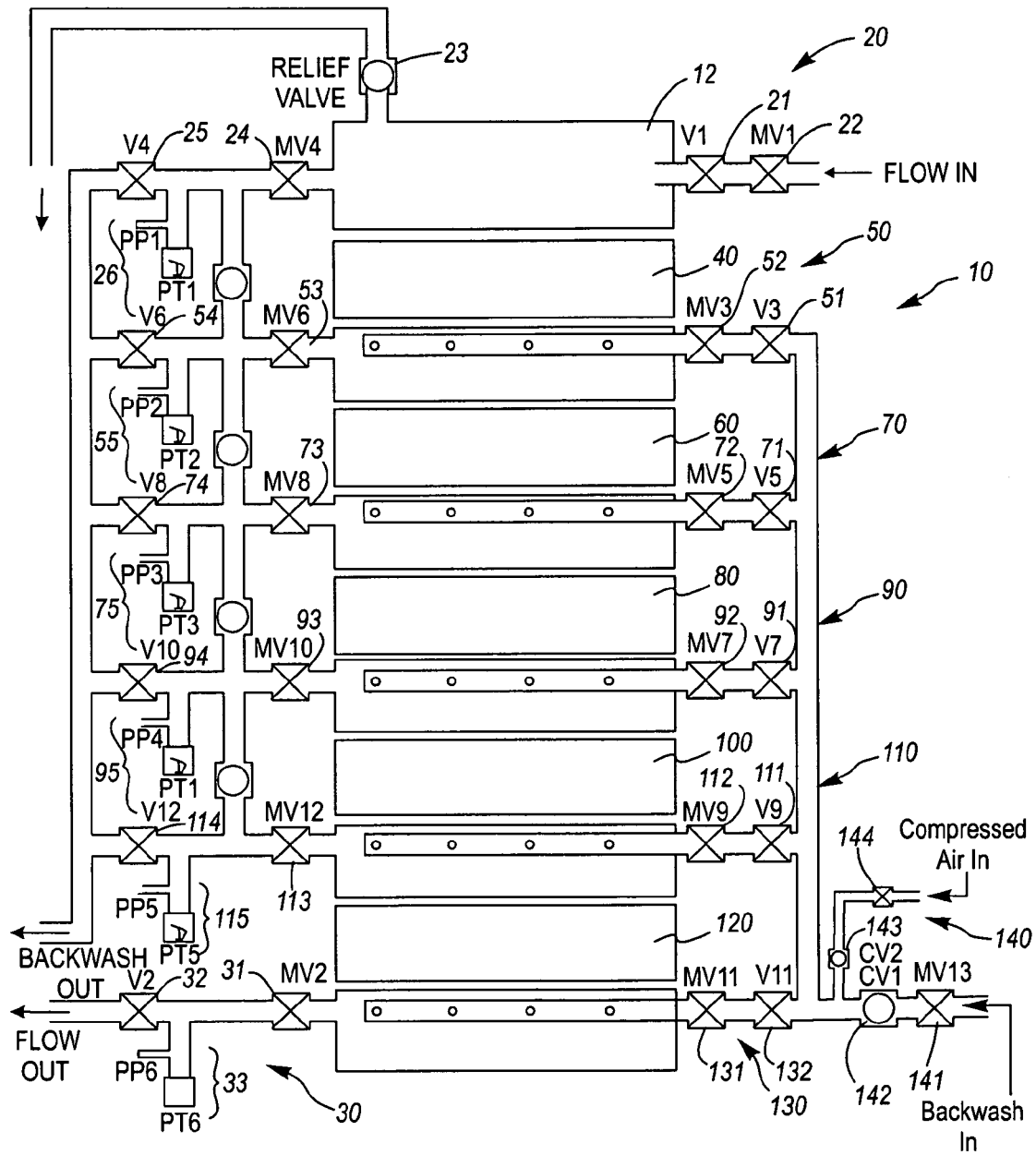
FIG. 14 is a schematic view of the filter system in accordance with the embodiment of FIG. 1.

In FIG. 14, an embodiment of the operation of the filter system 10 is disclosed. For example, the filter system is arranged as disclosed above. Each of the modules includes a layer of sand between the screen assemblies. In normal operation, the influent flow is introduced into the influent chamber 20 in a forward flow, meaning flow through the filter system caused mainly by forced or pressurized flow through the filter system. The flow is distributed across the influent chamber 20 then through the first module 40. While passing through the first module 40, the flow is passes through the upper section 41 to the lower section 42. In the upper section 41 the flow first passes through the screen assembly 43 then the filter media 44 and finally the screen assembly 45. The screen assemblies and filter media are selected to filter particles from the flow to treat the influent. The treatment of the influent starts with the largest particles being removed from the first module 40, then gradually providing finer media throughout the other modules until the smallest particles to be treated are removed in the fifth module 120. After the flow passes through the fifth module 120, the flow is filtered and is directed out from the filter system 10.

Filter media can be arranged to include larger media at the top of the filter system 10 and smaller particles at the bottom. For example, the first module 40 can include about 1.0 millimeter walnut shells, anthracite or No. 4 (0.80 millimeter) sand; the intermediate modules can include walnut shells, anthracite, No. 3 (0.45 millimeter) sand or No. 2 (0.25 millimeter) sand; and the fifth module 120 can include 0.2 garnet. Another aspect of providing variations in the backwash flow is to account for the different types of media provided in each module. The modules prevent the different types of filter media from being mixed together when the filter system is backwashed.

When any of the modules become occluded, a backwash flow is introduced into the filter system 10. The modules may become occluded after solids are built up on the screen assemblies and/or in the filter media. Each of the pressure sensors are set to monitor the pressure in the respective section of the filter system 10. For example, the pressure sensors can be preset to a limit of about 5 PSI to about 15 PSI, and more specifically at about 10 PSI. For example, the pressure sensors can be set to open the bypass valves at about 8 PSI on any one module and about 9 PSI on another. Each module is set to a desired pressure differential, to meet a given process requirement. The pressure settings can be programmed at the process site with a PLC or remotely using a modem from a computer. Once the pressure differential across a module exceeds the preset limit, the control assembly bypasses the occluded portion by opening a bypass valve creating a bypass flow. The bypass flow then continues to be filtered in the remaining modules bypassing the occluded module.

The pressure sensors can be set to trigger the backwash flow at a desired pressure, e.g., 10 PSI, when all five modules become occluded. The backwash flow can then be introduced to one or more modules to unclog them. This option reduces the amount of time needed to backwash the filter system 10. Another option would be to set the pressure sensors at the bypass valves at about 10 PSI and the pressure sensors at the backwash control assembly at about 8 PSI to about 9 PSI. In this manner, the filter system 10 will backwash each module when the module becomes occluded. The bypass valves can also be used to bypass a module that cannot be backwashed due to a malfunction in the system.

Once the fifth module is occluded, however, the filter system is shutdown until the occluded modules are backwashed to reset the filter system 10. Usually, the entire filter system is backwashed at this point. An aspect of the present invention is that each individual module can be backwashed independently. To unclog a module, a backwash flow is introduced through backwash valves to a backwash tube. The backwash flow is pressurized to provide a reverse flow through the screen assemblies and filter media to remove accumulated particles from the filter system 10 and to a backwash outlet. The backwash flow can be introduced to a module during operation or when the filter system is shut down. The filter system 10 includes control assemblies outside the modules to provide easy accessibility to the components of the filter system 10 for maintenance and repair.

The backwash flow can be set to a desired interval to backwash each module separately at a specified time. Each module can also be set to a desired backwash duration. For example, the duration may be set to backwash for a few seconds to multiple minutes, such as about fifteen minutes. The duration and quantity of the backwash is calculated over a 24 hour period and stored in a computer. The filter system 10 can be preset to backwash during a specified time of each day to meet any given water requirements in another section of operation at a plant. In addition, an alarm can be provided to sound externally from the PLC to indicated a malfunction and the location of the malfunction.

The filter system 10 can be provided in parts for easy assembly, maintenance and repair. For example, the filter system 10 can be provided with an upper section 16 and a lower section 17 having a seal 18 between the upper and lower sections 16, 17 as shown in FIGS. 2-5. Additionally, any one or more of the modules can be the removed to repair or replace damaged media without replacing all of the filter media in the filter system 10.

Figure 15:
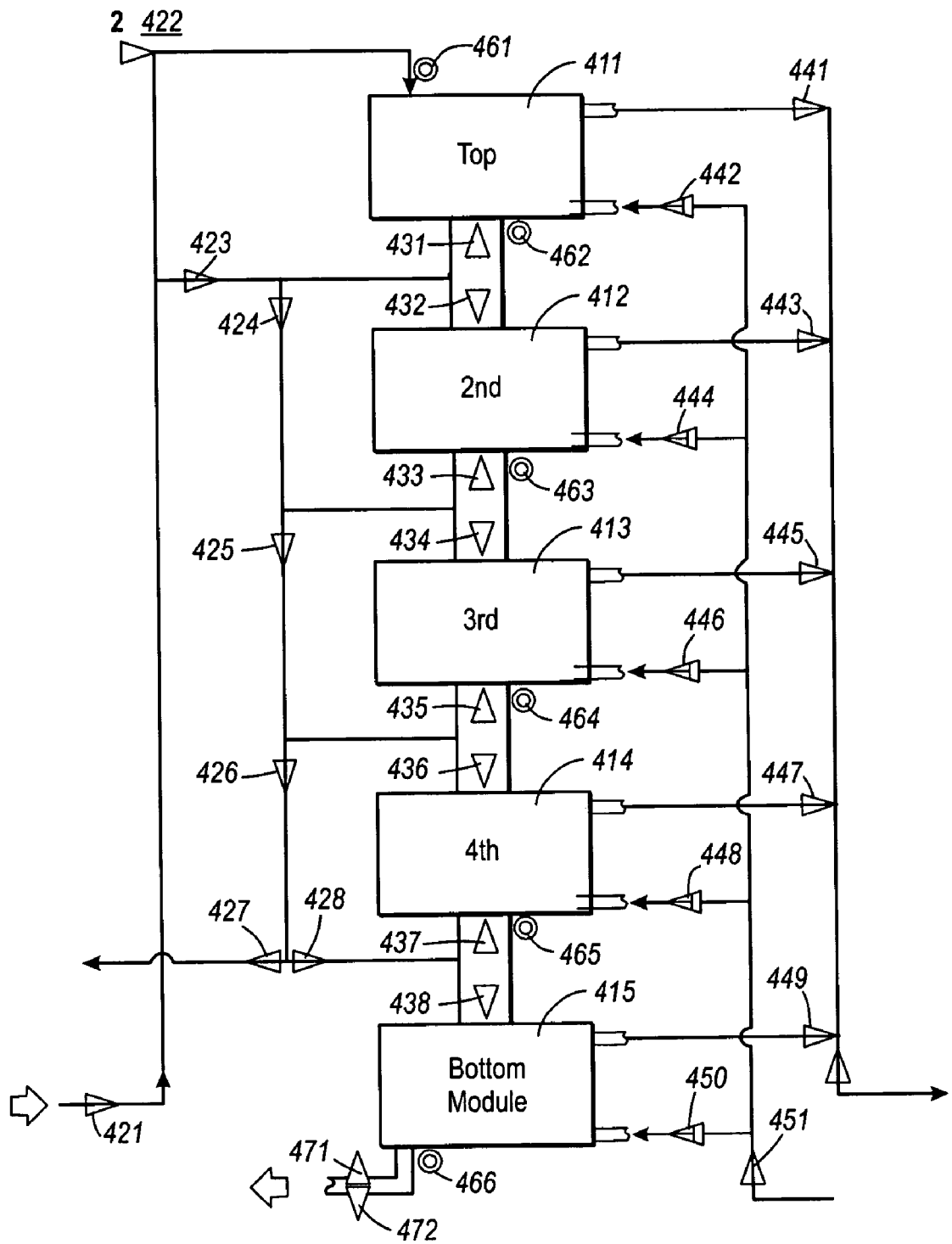
FIG. 15 is a schematic view of a filter system in accordance with another embodiment of the present invention.

As illustrated in FIG. 15, an alternative embodiment of a filter system 400 is disclosed. The filter system 400 is operated in a normal forward flow when the influent flows sequentially through a set of modules 410 without backwashing or bypassing any of the modules. The set of modules 410 includes a first module 411, a second module 412, a third module 413, a forth module 414 and a fifth module 415. Each of the modules 410 include a screen assembly and filter media similar to those discussed above with respect to the filter system 10. The filter systems also includes an influent control assembly 420, a module control assembly 430, a backwash control assembly 440, a pressure control assembly 460 and an effluent control assembly 470. Each of these control assemblies may include one or more of each of the following: valves, pressure sensors, piping, switches and other components known in the art to control fluid flow.

The influent control assembly 420 includes valves 421 through 428. Valve 421 is positioned between the influent source and the inlet to the filter system 400. Valve 422 is positioned between valve 421 and the first module 411. Valve 423 is arranged in a fluid line connected between the first module 411 and the second module 412 and positioned between the line connecting valve 421 and valve 422. Valve 424 is arranged in a fluid line connected between the second module 412 and the third module 413 and positioned between the line connecting valve 423 and valve 425. Valve 425 is arranged in a fluid line connected between the third module 413 and the fourth module 414 and positioned between the line connecting valve 424 and valve 426. Valve 426 is arranged in a fluid line connected between the fourth module 414 and the fifth module 415 and a recycle line to an influent feed tank. Valve 426 is positioned between the line connecting valve 425 and valves 427, 428. Valve 427 controls the flow to the recycle line to direct the flow towards the influent feed tank. Valve 428 controls the flow to the fifth module 415.

The module control assembly 430 includes valves 431 through 438. Valves 431 and 432 are positioned between the first module 411 and the second module 412. Valve 431 controls flow up through the first module 411. Valve 432 controls flow down through the second module 412. Valves 433 and 434 are positioned between the second module 412 and the third module 413. Valve 433 controls flow up through the second module 412. Valve 434 controls flow down through the third module 413. Valves 435 and 436 are positioned between the third module 413 and the fourth module 414. Valve 435 controls flow up through the third module 413. Valve 436 controls flow down through the fourth module 414. Valves 437 and 438 are positioned between the fourth module 414 and the fifth module 415. Valve 437 controls flow up through the fourth module 414. Valve 438 controls flow down through the fifth module 415.

The backwash control assembly 440 includes valves 441 through 451. Valves 441, 442 are in fluid connection with the first module 411. Valve 441 is positioned between the first module 411 and a backwash outlet. Valve 442 is positioned between the first module 411 and the backwash inlet to direct flow from a backwash source up through the first module 411. Valves 443, 444 are in fluid connection with the second module 412. Valve 443 is positioned between the second module 412 and the backwash outlet. Valve 444 is positioned between the second module 412 and the backwash inlet to direct flow from the backwash source up through the second module 412. Valves 445, 446 are in fluid connection with the third module 413. Valve 445 is positioned between the third module 413 and the backwash outlet. Valve 446 is positioned between the third module 413 and the backwash inlet to direct flow from the backwash source up through the third module 413. Valves 447, 448 are in fluid connection with the fourth module 414. Valve 447 is positioned between the fourth module 414 and the backwash outlet. Valve 448 is positioned between the fourth module 414 and the backwash inlet to direct flow from the backwash source up through the fourth module 414. Valves 449, 450 are in fluid connection with the fifth module 415. Valve 449 is positioned between the fifth module 415 and the backwash outlet. Valve 450 is positioned between the fifth module 415 and the backwash inlet to direct flow from the backwash source up through the fifth module 415. Valve 451 is positioned between the backwash source and valves 442, 444, 446, 448 and 450. Valve 451 is a main shutoff valve for the backwash control assembly 440.

The pressure control assembly 460 includes pressure sensors 461 through 466. Pressure sensor 461 monitors the pressure in the first module 411. Pressure sensor 462 monitors the pressure difference between the first module 411 and the second module 412. Pressure sensor 463 monitors the pressure difference between the second module 412 and the third module 413. Pressure sensor 464 monitors the pressure difference between the third module 413 and the fourth module 414. Pressure sensor 465 monitors the pressure difference between the fourth module 414 and the fifth module 415. Pressure sensor 466 monitors the pressure difference between the fifth module 415 and the effluent line. When a preset limit of pressure is exceeded in one of the pressure sensors 461 through 466, the given pressure sensor sends a signal to a combination of valves to regulate the flow.

The effluent control assembly 470 includes valves 471 and 472. Valves 471 and 472 are positioned between the fifth module 415 and the effluent line. Valve 471 directs effluent flow to a water discharge for further processing, use or disposal. Valve 472 directs flow to a test line for testing the fluid content and recycling through the filter system 400.

In normal forward flow operation, valve 421 is open, as it will be whenever the filter system 400 is in operation. Valve 422 and valve 471 are open, as they will be whenever the filter system 400 is in operation, other than during certain times during backwashing discussed below. The valves in the module control assembly 430 are open to allow flow to pass downward through each of the modules. The valves in the backwash control assembly 440 are initially closed. Valves 423 through 428 are initially closed. Valve 472 is closed other than during effluent testing as noted below. During normal flow, the influent enters the top of the first module 411 and passes through each of the successive modules 412 through 415 to exit the bottom of the fifth module 415 and out the effluent flow line to the water discharge.

When a preset pressure change across the first module 411 is exceeded due to solids accumulating in the first module 411, a signal is sent to indicate that the module requires backwashing. First, valve 423 opens to provide alternate flow to the second module 412 bypassing the first module 411. Second, valves 422 and 431 close to isolate and bypass the first module 411. Third, valves 441, 442 and 451 open to allow backwashing of the first module 411. The backwash flow enters the bottom of the first module 411 through valve 442 and out valve 441 to a backwash outlet. The backwash flow removes any accumulated solids in the filter media in the first module 411. After backwashing for a defined period, all valves return to the normal forward flow position discussed above.

When a preset pressure change across the second module 412 is exceeded due to solids accumulating in the second module 412, a signal is sent to indicate that the module requires backwashing. First, valve 424 opens to provide alternate flow to the third module 413 bypassing the second module 412. Second, valves 432 and 433 close to isolate and bypass the second module 412. Third, valves 443, 444 and 451 open to allow backwashing of the second module 412. The backwash flow enters the bottom of the second module 412 through valve 444 and out valve 443 to the backwash outlet. The backwash flow removes any accumulated solids in the filter media in the second module 412. After backwashing for a defined period, all valves return to the normal forward flow position discussed above.

When a preset pressure change across the third module 413 is exceeded due to solids accumulating in the third module 413, a signal is sent to indicate that the module requires backwashing. First, valve 425 opens to provide alternate flow to the fourth module 414 bypassing the third module 413. Second, valves 434 and 435 close to isolate and bypass the third module 413. Third, valves 445, 446 and 451 open to allow backwashing of the third module 413. The backwash flow enters the bottom of the third module 413 through valve 446 and out valve 445 to the backwash outlet. The backwash flow removes any accumulated solids in the filter media in the third module 413. After backwashing for a defined period, all valves return to the normal forward flow position discussed above.

When a preset pressure change across the fourth module 414 is exceeded due to solids accumulating in the fourth module 414, a signal is sent to indicate that the module requires backwashing. First, valve 426 opens to provide alternate flow to the fifth module 415 bypassing the fourth module 414. Second, valves 436 and 437 close to isolate and bypass the fourth module 414. Third, valves 447, 448 and 451 open to allow backwashing of the fourth module 414. The backwash flow enters the bottom of the fourth module 414 through valve 448 and out valve 447 to the backwash outlet. The backwash flow removes any accumulated solids in the filter media in the fourth module 414. After backwashing for a defined period, all valves return to the normal forward flow position discussed above.

When a preset pressure change across the fifth module 415 is exceeded due to solids accumulating in the fifth module 415, a signal is sent to indicate that the fifth module 415 requires backwashing. Although the fifth module can be independently backwashed using the following steps, the entire filter system 400 is usually backwashed once the fifth module 415 becomes occluded. If the fifth module 415 is bypassed, the effluent usually cannot be discharged as product and should be recycled. To backwash the fifth module independently, valves 427 and 428 open to provide flow to the influent feed tank. Then, valves 438 and 471 close to isolate the fifth module 415. Next, valves 449, 450 and 451 open to allow backwashing of the fifth module 415. The backwash flow enters the bottom of the fifth module 415 through valve 450 and out valve 449 to the backwash outlet. The backwash flow removes any accumulated solids in the filter media in the fifth module 415. After backwashing for a defined period, all valves return to the normal forward flow position discussed above after restart flow has been evaluated.

During restart flow, valve 471 remains closed and valve 472 opens to allow recycle wasting restart flow. Restart flow is evaluated after the backwash cycle in the fifth module 415. The flow is wasted or returned to the influent feed tank to insure that the product meets a defined water quality. After a predetermined restart flow period, the valves are returned to the normal forward flow positions.

Figure 16:
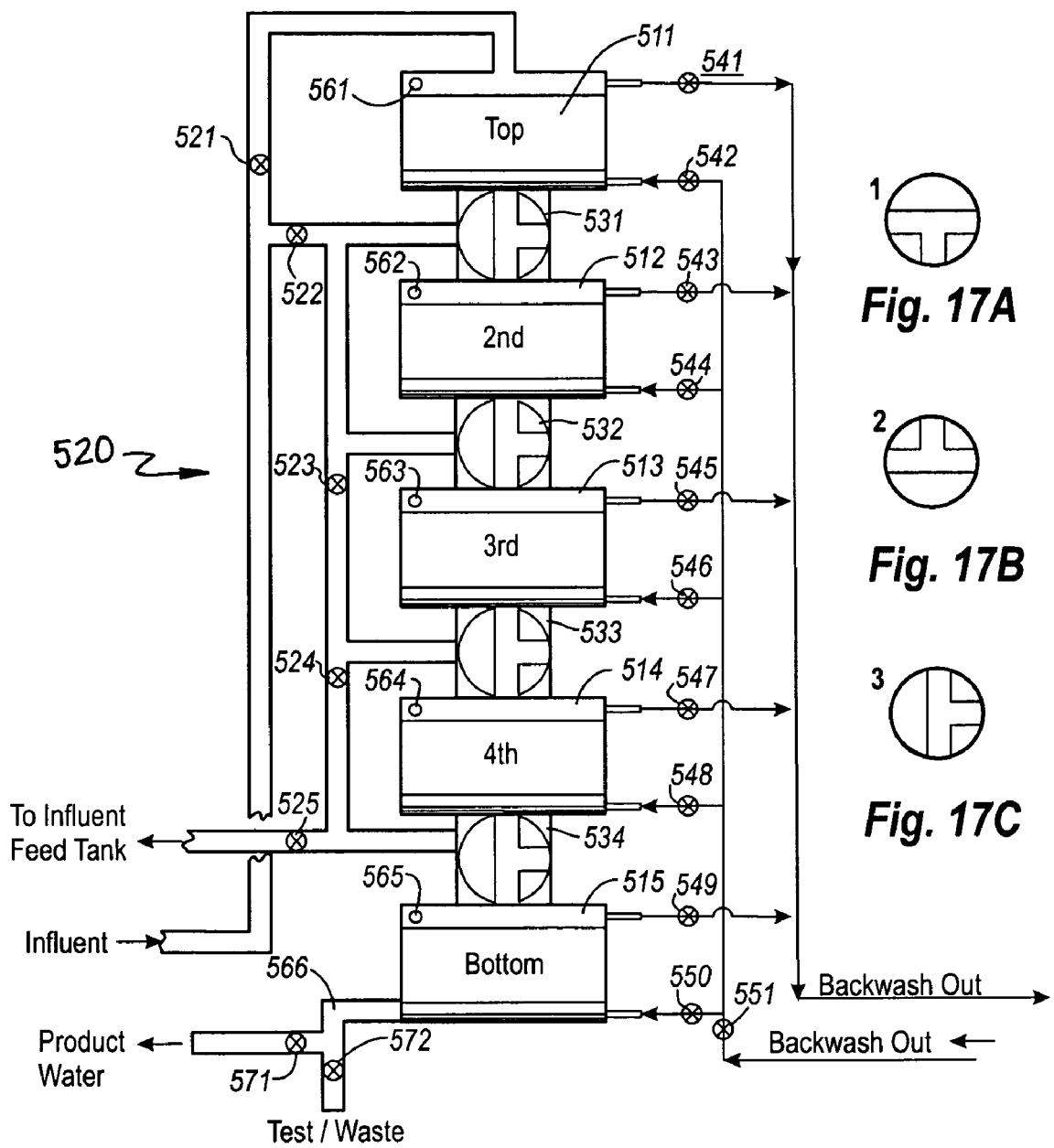
FIG. 16 is a schematic view of a filter system in accordance with a further embodiment of the present invention.

As illustrated in FIG. 16, a further embodiment of a filter system 500 is disclosed. The filter system 500 is operated in a normal forward flow when the influent flows sequentially through a set of modules 510 without backwashing or bypassing any of the modules. The set of modules 510 includes a first module 511, a second module 512, a third module 513, a forth module 514 and a fifth module 515. Each of the modules 510 include a screen assembly and filter media similar to those discussed above with respect to the filter system 10. The filter system 500 also includes an influent control assembly 520, a module control assembly 530, a backwash control assembly 540, a pressure control assembly 560 and an effluent control assembly 570. Each of these control assemblies may include one or more of each of the following: valves, pressure sensors, piping, switches and other components known in the art to control fluid flow.

The influent control assembly 520 includes valves 521 through 525. Valve 521 is positioned between the influent source and the inlet to the filter system 500 at the first module 511. Valve 522 is positioned in a fluid line between the valve 521 and the influent source and provides control to direct flow to a line between the first module 511 and the second module 512, and to direct flow to a line between the second module 512 and the third module 513. Valve 523 is positioned in a fluid line connected between the third module 513 and the fourth module 514 and positioned between the line connecting valve 522 and valve 524. Valve 524 is arranged in a fluid line connected between the fourth module 514 and the fifth module 515 and positioned between the line connecting valve 523 and valve 525. Valve 525 controls the flow to the recycle line to direct the flow towards the influent feed tank.

The module control assembly 530 includes valves 531 through 534. Valve 531 is positioned between the first module 511 and the second module 512. Valve 531 controls flow between the first module 511 and the second module 512. Valve 532 is positioned between the second module 512 and the third module 513. Valve 532 controls flow between the second module 512 and the third module 513. Valve 433 is positioned between the third module 513 and the fourth module 514. Valve 533 controls flow between the third module 513 and the fourth module 514. Valve 534 is positioned between the fourth module 514 and the fifth module 515. Valve 533 controls flow between the fourth module 514 and the fifth module 515. Each of the valves in the module control assembly 530 includes a tee configuration having three operating positions. In position 1, flow enters from the influent control assembly 520 and is directed down through the module below the valve as shown in FIG. 17A. In position 2, flow enters from the influent control assembly 520 and is directed down through the module above the valve as shown in FIG. 17B. In position 3, flow passes from one module located above the valve to another module located below the valve and is restricted from communication with the influent control assembly 520 as shown in FIG. 17C.

The backwash control assembly 540 includes valves 541 through 551. Valves 541, 542 are in fluid connection with the first module 511. Valve 541 is positioned between the first module 511 and the backwash outlet. Valve 542 is positioned between the first module 511 and the backwash inlet to direct flow from the backwash source up through the first module 511. Valves 543, 544 are in fluid connection with the second module 512. Valve 543 is positioned between the second module 512 and the backwash outlet. Valve 544 is positioned between the second module 512 and the backwash inlet to direct flow from the backwash source up through the second module 512. Valves 545, 546 are in fluid connection with the third module 513. Valve 545 is positioned between the third module 513 and the backwash outlet. Valve 546 is positioned between the third module 513 and the backwash inlet to direct flow from the backwash source up through the third module 513. Valves 547, 548 are in fluid connection with the fourth module 514. Valve 547 is positioned between the fourth module 514 and the backwash outlet. Valve 548 is positioned between the fourth module 514 and the backwash inlet to direct flow from the backwash source up through the fourth module 514. Valves 549, 550 are in fluid connection with the fifth module 515. Valve 549 is positioned between the fifth module 515 and the backwash outlet. Valve 550 is positioned between the fifth module 515 and the backwash inlet to direct flow from the backwash source up through the fifth module 515. Valve 551 is positioned between the backwash source and valves 542, 544, 546, 548 and 550. Valve 551 is a main shutoff valve for the backwash control assembly 540.

The pressure control assembly 560 includes pressure sensors 561 through 566. Pressure sensor 561 monitors the pressure in the first module 511. Pressure sensor 562 monitors the pressure difference between the first module 511 and the second module 512. Pressure sensor 563 monitors the pressure difference between the second module 512 and the third module 513. Pressure sensor 564 monitors the pressure difference between the third module 513 and the fourth module 514. Pressure sensor 565 monitors the pressure difference between the fourth module 514 and the fifth module 515. Pressure sensor 566 monitors the pressure difference between the fifth module 515 and the effluent line. When a preset pressure is exceeded in one of the pressure sensors 561 through 566, the given pressure sensor sends a signal to a combination of valves to regulate the flow.

The effluent control assembly 570 includes valves 571 and 572. Valves 571 and 572 are positioned between the fifth module 515 and the effluent line. Valve 571 directs effluent flow to a water discharge for further processing, use or disposal. Valve 572 directs flow to a test line for testing the fluid content and recycling through the filter system 500.

In normal forward flow operation, valves 521 and 571 are open, as they will be whenever the filter system 500 is in operation. Valve 521 directs flow into the first module 511 from an influent source. The valves in the module control assembly 530 are arranged in position 3 to allow flow to pass downward through each of the modules. The valves in the backwash control assembly 540 and valves 522 through 525 are initially closed. Valve 572 is closed other than during effluent testing as noted below. Valve 572 is opened to test product water quality or to waste restart flow. When it is necessary to backwash the fifth module 515, the discharge from the fourth module 514 may not be acceptable as product water. Thus, the flow is usually recycled while the fifth module 515 is being backwashed. Once the fifth module 515 is returned to operation, restart flow is recycled through the filter system 500 for a period until the treated flow meets a specified water quality. When the treated flow meets the specified water quality, the flow is returned to normal flow through the filter system 500. During normal flow, the influent enters the top of the first module 511 and passes through each of the successive modules 512 through 515 to exit the bottom of the fifth module 515 and out the effluent flow line to the water discharge.

When a preset pressure change across the first module 511 is exceeded due to solids accumulating in the first module 511, a signal is sent to indicate that the module requires backwashing. First, valve 522 opens to provide alternate flow to the second module 512 bypassing the first module 511. Second, valve 521 closes to isolate and bypass the first module 511. Third, valve 531 moves to position 1 to isolate the first module 511 and direct flow to the second module 512. Then valves 541, 542 and 551 open to allow backwashing of the first module 511. The backwash flow enters the bottom of the first module 511 through valve 542 and out valve 541 to the backwash outlet. The backwash flow removes any accumulated solids in the filter media in the first module 511. After backwashing for a defined period, all valves return to the normal forward flow position discussed above.

When a preset pressure change across the second module 512 is exceeded due to solids accumulating in the second module 512, a signal is sent to indicate that the module requires backwashing. First, valve 531 moves to position 2 and valve 532 moves to position 1 to isolate the second module 512 and direct flow through the third module 513. Second, valves 543, 544 and 551 open to allow backwashing of the second module 512. The backwash flow enters the bottom of the second module 512 through valve 544 and out valve 543 to the backwash outlet. The backwash flow removes any accumulated solids in the filter media in the second module 512. After backwashing for a defined period, all valves return to the normal forward flow position discussed above.

When a preset pressure change across the third module 513 is exceeded due to solids accumulating in the third module 513, a signal is sent to indicate that the module requires backwashing. First, valve 523 opens to provide alternate flow to the fourth module 514 bypassing the third module 513. Second, valve 532 moves to position 2 and valve 533 moves to position 1 to isolate the third module 513 and direct flow through the fourth module 514. Third, valves 545, 546 and 551 open to allow backwashing of the third module 513. The backwash flow enters the bottom of the third module 513 through valve 546 and out valve 545 to the backwash outlet. The backwash flow removes any accumulated solids in the filter media in the third module 513. After backwashing for a defined period, all valves return to the normal forward flow position discussed above.

When a preset pressure change across the fourth module 514 is exceeded due to solids accumulating in the fourth module 514, a signal is sent to indicate that the module requires backwashing. First, valve 524 opens to provide alternate flow to the fifth module 515 bypassing the fourth module 514. Second, valve 533 moves to position 2 and valve 534 moves to position 1 to isolate the fourth module 514 and direct flow through the fifth module 515. Third, valves 547, 548 and 551 open to allow backwashing of the fourth module 514. The backwash flow enters the bottom of the fourth module 514 through valve 548 and out valve 547 to the backwash outlet. The backwash flow removes any accumulated solids in the filter media in the fourth module 514. After backwashing for a defined period, all valves return to the normal forward flow position discussed above.

When a preset pressure change across the fifth module 515 is exceeded due to solids accumulating in the fifth module 515, a signal is sent to indicate that the fifth module 515 requires backwashing. Although the fifth module 515 can be independently backwashed using the following steps, the entire filter system 500 is usually backwashed once the fifth module 515 becomes occluded. Effluent from module 514 may not be acceptable as product or as waste in some environs. Consequently, when module 515 is occluded, the filtration process is usually suspended and the entire filter is backwashed. If module 515 is to be backwashed independently, the valve 525 opens to provide flow to the influent feed tank. Then, valve 534 moves to position 2 and valve 571 closes to isolate the fifth module 515. Next, valves 549, 550 and 551 open to allow backwashing of the fifth module 515. The backwash flow enters the bottom of the fifth module 515 through valve 550 and out valve 549 to the backwash outlet. The backwash flow removes any accumulated solids in the filter media in the fifth module 515. After backwashing for a defined period, all valves return to the normal forward flow position discussed above after restart flow has been evaluated.

During restart flow, valve 571 remains closed and valve 572 opens to allow recycle wasting restart flow. Restart flow is evaluated after the backwash cycle in the fifth module 515. The flow is wasted or returned to the influent feed tank to insure that the product meets a defined water quality. After a predetermined restart flow period, the valves are returned to the normal forward flow positions.

The present invention may be embodied in other specific forms without departing from its spirit or essential characteristics. For example, the quantity of modules and filter media is determined by the specific characteristics of the particular flow to be treated. Although the disclosed embodiments of the invention include five modules, other embodiments can include more or less, such as two to fifteen modules. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A filter system comprising:
   a set of modules stacked on top of each other, each module including screen assemblies and filter media sandwiched between the screen assemblies;
   fluid lines communicating flow selectively to the individual modules; and
   a plurality of control assemblies associated with each module, each of the control assemblies including at least one external valve and being in fluid communication with a corresponding module to control flow through the corresponding module, the fluid lines and the control assemblies operable for selectively controlling fluid in each module through:
   a forward flow through a series of modules, the forward flow passing through the screen assemblies in one module then continuing to a subsequent module to treat an influent flow,
   a bypass flow to selectively bypass at least one of the modules, the forward flow from a module being bypassed around at least one subsequent module in the series of modules and the bypass flow being reintroduced in a subsequent module, and
   a reverse flow provided through a bypassed module.

2. The filter system of claim 1, wherein each of the control assemblies includes an influent control assembly in fluid communication with the corresponding module, an effluent control assembly in fluid communication with the corresponding module, a module control assembly in fluid communication with the corresponding module, and a backwash control assembly in fluid communication with the corresponding module.

3. The filter system of claim 2, wherein each of the control assemblies bypasses the corresponding module while the corresponding module is being backwashed.

4. The filter system of claim 2, further comprising a pressure control assembly connected to the control assemblies to monitor pressure in each of the modules.

5. The filter system of claim 4, wherein when a pressure differential between modules exceeds a preset limit to define an occluded module, the control assemblies redirect flow to bypass the occluded module.

6. The filter system of claim 4, wherein when a pressure differential between modules exceeds a preset limit to define an occluded module, the control assemblies redirect flow in the modules to backwash the occluded module.

7. The filter system of claim 1, wherein each of the control assemblies are provided externally to the set of modules and the backwash assembly extends into each of the modules below the screen assemblies.

8. The filter system of claim 1, wherein the at least one external valve is manually controlled.

9. The filter system of claim 1, wherein the at least one external valve is automatically controlled.

10. A method of filtering influent, comprising:
    providing an influent flow to a set of modules stacked on top of each other, each module including screen assemblies and filter media sandwiched between the screen assemblies;
    filtering the influent by directing the influent through fluid lines and control assemblies operable for selectively communicating flow to individual modules;
    selectively bypassing a forward flow from a module being bypassed around a subsequent module when the module becomes occluded, the forward flow being reintroduced from a previous module to a subsequent module; and
    backwashing the occluded module by providing a reverse flow through the screen assemblies and the filter media while bypassing the forward flow around the occluded module.

11. The method of claim 10, wherein the step of bypassing the given module further includes directing the flow externally from the set of modules at one module and back into another module.

12. The method of claim 11, wherein the step of directing the flow externally is accomplished through control assemblies connected to a series of valves.

13. The method of claim 10, wherein the step of backwashing the occluded module further includes providing a flow in a lower section of the occluded module up through the upper section of the occluded module.

14. The method of claim 13, wherein the step of providing a flow in a lower section of the occluded module is accomplished through control assemblies connected to a series of valves.

15. The method of claim 10, wherein the step of backwashing the occluded module further includes providing a flow in a dispersing pattern through at least one of the modules.

16. The method of claim 10, further comprising monitoring a pressure in each of the modules.

17. The method of claim 16, wherein the step of monitoring the pressure further includes sending a signal to control assemblies to redirect flow between the modules.

18. The method of claim 10, wherein the step of bypassing the given module occurs prior to the step of backwashing the occluded module.

19. The method of claim 18, wherein the step of bypassing the given module directs the flow out above the occluded module, then back into the set of modules below the occluded module.

20. The method of claim 10, wherein the step of bypassing the given module directs flow to a module having a finer filter media.

21. A filter system comprising:
a set of modules stacked on top of each other, each module including screen assemblies and filter media sandwiched between the screen assemblies;
fluid lines communicating flow selectively to the individual modules; and
a plurality of control assemblies associated with each module, each of the control assemblies being in fluid communication with a corresponding module to control flow through the corresponding module, the fluid lines and control assemblies being operable for selectively controlling fluid in each of the modules to bypass a module from an earlier module around the bypassed module and reintroducing the flow in to a subsequent module while the bypassed module is being backwashed.

22. The filter system of claim 21, wherein each of the control assemblies includes an influent control assembly, an effluent control assembly, a module control assembly and a backwash control assembly, each of which being in fluid communication with the corresponding module.

23. The filter system of claim 22, further comprising a pressure control assembly connected to the control assemblies to monitor pressure in each of the modules.

24. The filter system of claim 23, wherein when the pressure differential between modules exceeds a preset limit to define an occluded module, the control assemblies redirect flow in the modules.

25. The filter system of claim 21, wherein each of the control assemblies are provided externally to the set of modules and the backwash assembly extends into each of the modules below the screen assemblies.

26. The filter system of claim 21, wherein each of the control assemblies include a valve selected from at least one of a manually controlled valve and an automatically controlled valve.

* * * * *